US010148757B2

(12) United States Patent
Kamalakantha et al.

(10) Patent No.: US 10,148,757 B2
(45) Date of Patent: Dec. 4, 2018

(54) MIGRATING CLOUD RESOURCES

(71) Applicant: Hewlett Packard Enterprise Development LP, Houston, TX (US)

(72) Inventors: Chandra H Kamalakantha, Plano, TX (US); Reinier J Aerdts, Plano, TX (US); Carl Kanzabedian, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 218 days.

(21) Appl. No.: 15/114,755

(22) PCT Filed: Feb. 21, 2014

(86) PCT No.: PCT/US2014/017621
§ 371 (c)(1),
(2) Date: Jul. 27, 2016

(87) PCT Pub. No.: WO2015/126411
PCT Pub. Date: Aug. 27, 2015

(65) Prior Publication Data
US 2016/0352836 A1 Dec. 1, 2016

(51) Int. Cl.
*G06F 17/28* (2006.01)
*G06F 17/30* (2006.01)
(Continued)

(52) U.S. Cl.
CPC ........ *H04L 67/1097* (2013.01); *G06F 9/4856* (2013.01); *G06F 17/28* (2013.01);
(Continued)

(58) Field of Classification Search
CPC . H04L 67/10; H04L 41/12; G06F 9/48; G06F 14/30
(Continued)

(56) References Cited

U.S. PATENT DOCUMENTS 6,968,324 B1 11/2005 Ruffin et al.
7,788,122 B2 8/2010 Greenstein
(Continued)

FOREIGN PATENT DOCUMENTS

WO WO-0125877 A2 4/2001

OTHER PUBLICATIONS

Baum, D., Delivering Cloud Services to the State of Texas, An Oracle Enterprise Architecture White Paper, Mar. 2013, 18 pages.
(Continued)

*Primary Examiner* — Glenford J Madamba
(74) *Attorney, Agent, or Firm* — Brooks, Cameron & Huebsch, PLLC

(57) ABSTRACT

Repository data fragments distributed across one or both of a first cloud and a network may be accessed. The repository data fragments may be combined into repository data. First resources of the first cloud, a dependency between the first resources, and second resources of a second cloud may be discovered. A migration map between the first cloud and the second cloud may be generated based on the discovered first and second resources and based on the repository data. The first resources may be migrated to the second cloud based on the migration map.

15 Claims, 6 Drawing Sheets

(51) Int. Cl.
*H04L 29/08* (2006.01)
*G06F 9/48* (2006.01)
*H04L 12/24* (2006.01)
*H04L 12/911* (2013.01)

(52) U.S. Cl.
CPC ............ *G06F 17/303* (2013.01); *H04L 41/12* (2013.01); *H04L 47/70* (2013.01)

(58) Field of Classification Search
USPC ........................................................ 709/226
See application file for complete search history.

(56) References Cited

U.S. PATENT DOCUMENTS

| | | |
|---|---|---|
| 8,073,880 B2 | 12/2011 | LaMonica |
| 8,306,518 B1 | 11/2012 | Gaillaux et al. |
| 8,972,405 B1* | 3/2015 | Chaulk ............. G06F 17/30194 707/737 |
| 2010/0179927 A1 | 7/2010 | Meher et al. |
| 2011/0055377 A1 | 3/2011 | Dehaan |
| 2011/0179112 A1 | 7/2011 | Ravichandran et al. |
| 2012/0096134 A1* | 4/2012 | Suit ....................... G06F 9/5072 709/221 |
| 2012/0096149 A1 | 4/2012 | Sunkara et al. |
| 2012/0221845 A1 | 8/2012 | Ferris |
| 2012/0239825 A1 | 9/2012 | Xia et al. |
| 2013/0031550 A1 | 1/2013 | Choudhury et al. |
| 2013/0198352 A1 | 8/2013 | Kalyanaraman et al. |
| 2013/0238804 A1 | 9/2013 | Tanino et al. |

OTHER PUBLICATIONS

Claybrook, B., How Providers Affect Cloud Application Migration, TechTarget, Jun. 2011, 24 pages.
International Search Authority. International Search Report dated Nov. 27, 2014. Application No. PCT/US2014017621 filing date Feb. 21, 2014, 10 pages.
Satzger, B. et al., Winds of Change: From Vendor Lock-in to the Meta Cloud, IEEE Computer Society, Jan./Feb. 2013, pp. 69-73.
SME, Cloud Migration Assistant, http://storagemadeeasy.com/wiki/cloudmigration/, 2012, 7 pages.
Tata Consultancy Services Limited, Business Intelligence & Performance Management, http://www.tcs.com/offerings/business-intelligence-performance-management/Pages/default.aspx, 3 pages. 2013.

* cited by examiner

MIGRATING CLOUD RESOURCES

BACKGROUND

Cloud computing uses multiple resources over a network, such as the Internet, to perform computing tasks. An application accessible to an end user may be run on multiple resources at the same time. A combination of hardware and virtual hardware may be abstracted to the end user. Thus the end user may not require knowledge of the underlying workings of the cloud. The end user may simply send a service request to the cloud and subsequently receive a service result.

BRIEF DESCRIPTION OF THE DRAWINGS

Some examples are described with respect to the following figures.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Some migration repositories used with cloud migration tools may not store repository data effectively, the repository data may become stale in that it may not accurately reflect current cloud resource topology, or the repository data may be duplicated or incomplete.

Accordingly, the present disclosure provides federation of repository data to allow organizations by store migration data in various federated data stores as data fragments. This may allow more effective updating of the migration repository to prevent the migration repository data from getting stale as additional migrations occur. The migration data may represent migration archetypes or past migrations, for example. The present disclosure may allow migration data may be used and improved recursively, in that it may be re-used as additional migrations are performed, and that the migration data may be improved in accuracy and content as additional migration are performed. Additionally, the present disclosure may use declarative language, e.g. semantic technologies, to dynamically query machine discoverable metadata. Thus, for example, data may be kept current more effectively and may provide a more effective knowledge-base for generating models and mappings for migrations.

Figure 1:
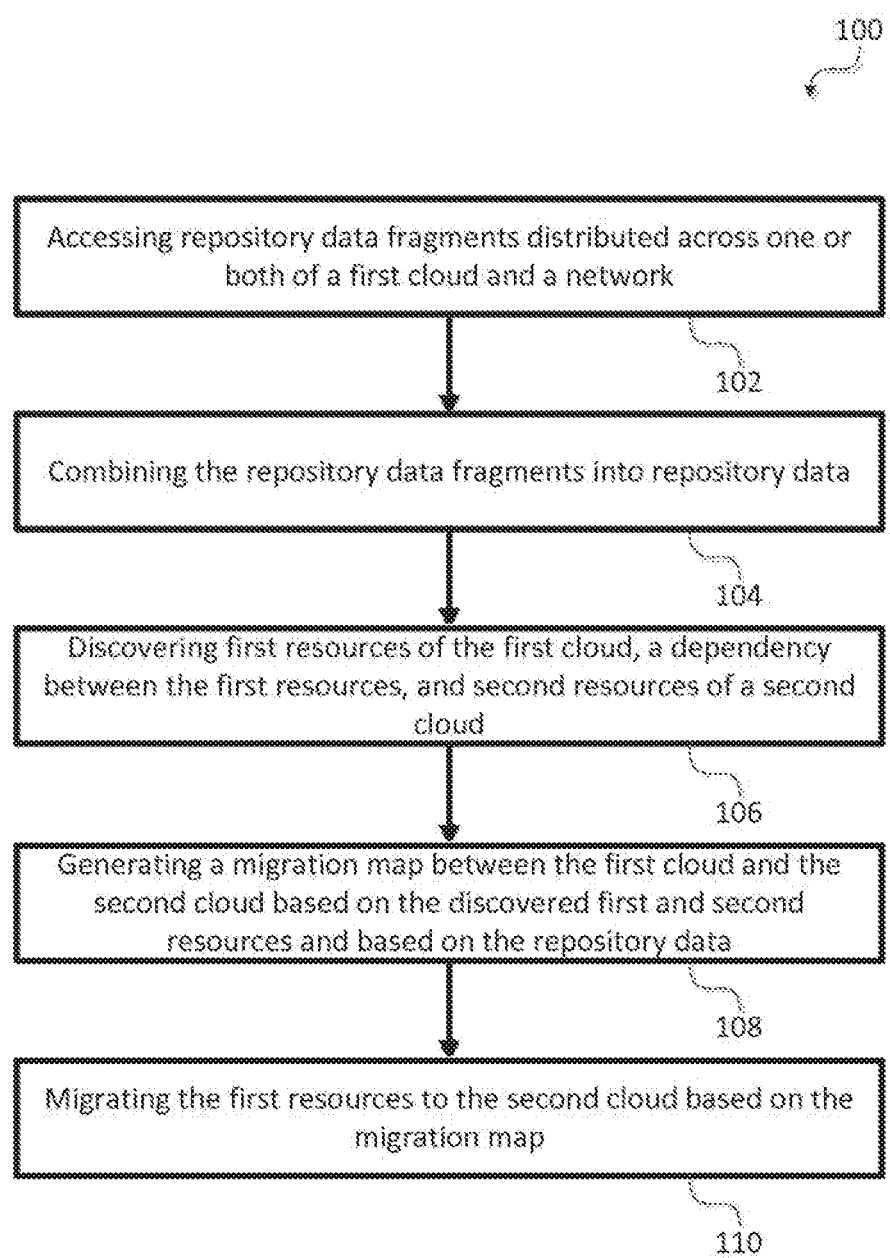
FIG. 1 is a flow diagram illustrating a method of cloud migration according to some examples.

FIG. 1 is a flow diagram illustrating a method 100 of cloud migration according to some examples. The method may be computer implemented. At block 102, repository data fragments distributed across one or both of a first cloud and a network may be accessed. At block 104, the repository data fragments may be combined into repository data. At block 106, first resources of the first cloud, a dependency between the first resources, and second resources of a second cloud may be discovered. At block 108, a migration map between the first cloud and the second cloud may be generated based on the discovered first and second resources and based on the repository data. At block 110, the first resources may be migrated to the second cloud based on the migration map.

Figure 2A:
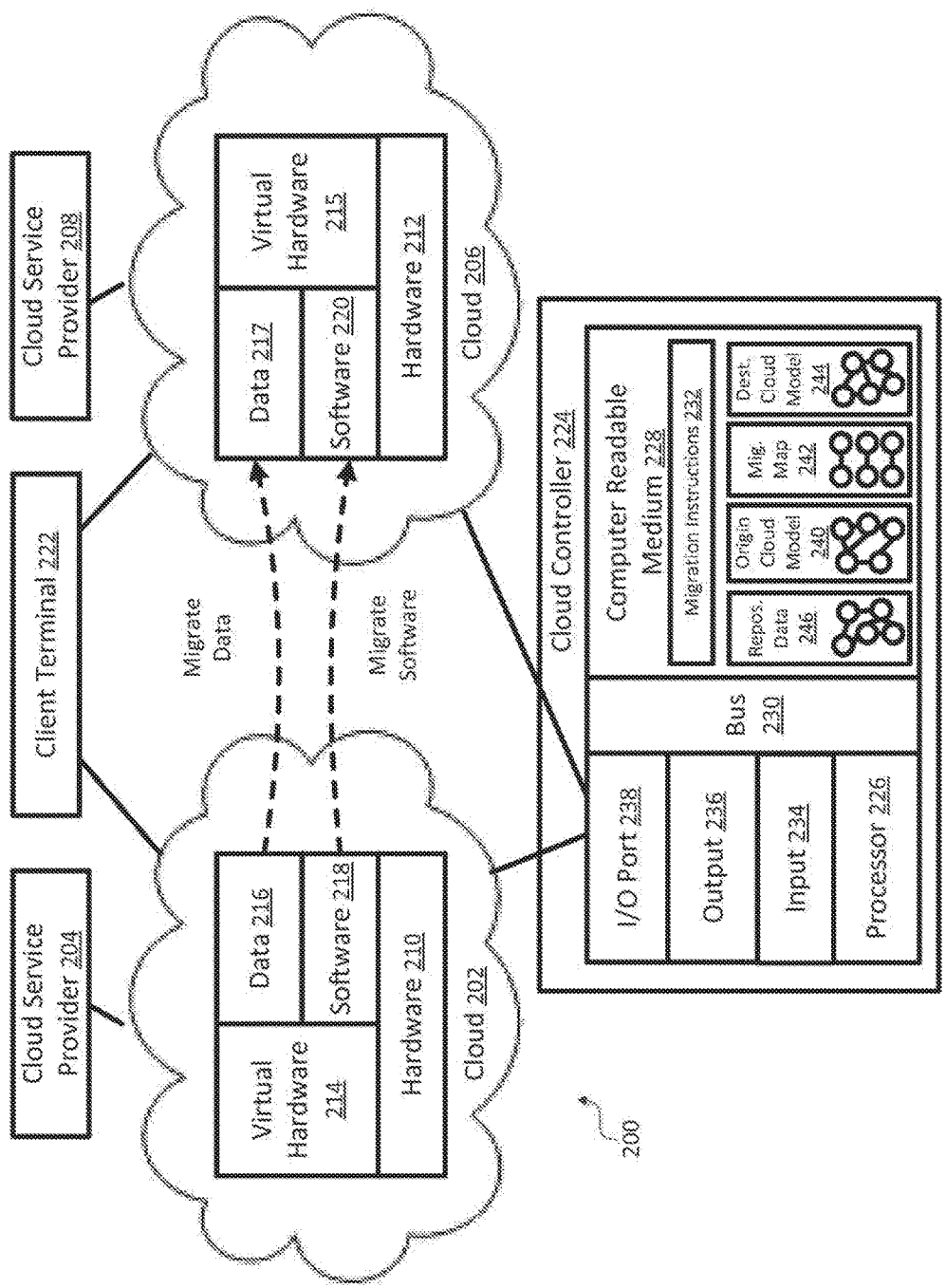
FIGS. 2a-b are simplified illustrations of aspects of a cloud computing environment according to some examples.

FIG. 2a is a simplified illustration of some aspects of a cloud computing environment 200. The cloud computing environment 200 may include a cloud 202 operated by a cloud service provider 204 and a cloud 206 operated by a cloud service provider 208. The cloud service providers 204 and 208 may be different providers or may be the same provider. Examples of cloud service providers include organizations or private companies, for example. In some examples, the clouds 202 and 204 each may be hosted by multiple cloud service providers and/or may comprised multiple clouds hosted across multiple cloud service providers.

The cloud 202 may be a network having resources such as hardware 210, virtual hardware 214, software 218, and data 216. The cloud 206 may be a network having resources such as hardware 212, virtual hardware 215, software 220, and data 217. A "resource" is an asset of a cloud computing system such as hardware, virtual hardware, software, data, or cloud computing service. The resources may be distributed such that the clouds 202 and 206 may each implement distributed computing. Although two cloud providers 204 and 208 and two clouds 202 and 206 are shown in FIG. 2a, any additional number of cloud providers and clouds may be present in the cloud computing environment 200.

Each of the clouds 202 and 206 may have any flavor, for example it may be a private cloud, public cloud, or a hybrid cloud having a combination of private and public cloud computing services. A "public cloud" is a network having a set of resources provided by a cloud service provider to the general public. A "private cloud" is a network having a set of resources operated for a single end user. Some public clouds may run "virtual private clouds" (VPCs), each of which includes resources of the public cloud, and which provide various levels of isolation from other VPCs by, for example, using firewall rules between VPCS and/or a Private IP Subnet and a virtual communication construct for each VPC.

"Hardware" is a physical device that performs the actual computing, processing, or storage in a cloud. "Virtual hardware" is software to be processed by hardware to emulate specific hardware or to abstract a resource that may have been accessed or addressed in a concrete manner. For example, a particular piece of software may be designed to be run by a specific type of hardware. By running virtual hardware on top of hardware, a given piece of hardware may run software designed for many different types of hardware. "Software", e.g. an application, is a set of components such as data and instructions that, when executed by a processor, cause the processor to perform a process. The application may have specific components. Software may include, for example, business software, and user data stored in the cloud. Software may be designed to operate with specific hardware, which may indicate the format of the processor instructions. Thus, using virtual hardware may allow different types of hardware to operate the same software. "Data" may include any data stored in a cloud on any hardware, and/or as part of any software. The data may be located in various stacks in the cloud, including in hardware, software, applications, and/or services.

One or more resources, including hardware, virtual hardware, software, and data, may be used to implement "cloud computing services", which are services provided to an end user who is to use the cloud. Cloud computing services may be provided according to various models, for example Software as a Service (SaaS), which is a model of software deployment in which a user accesses and uses a piece of software from a remote location. Instead of purchasing a license to operate the software on a local machine, a user may be charged by usage of the software which is available over a cloud. Other models include, for example, Infrastructure as a Service (IaaS), Platform as a Service (PaaS), Anything as a Service (XaaS). Strategy as a Service, Collaboration as a Service, Business Process as a Service, Database as a Service, Network as a Service (NaaS), and Communication as a Service (CaaS).

A client terminal 222 that is in communication with the clouds 202 and 206 may receive input from an end user for the clouds 202 and 206 to implement cloud computing services. For example, each of the clouds 202 and 206 may be to receive service requests from a client terminal 222 to perform cloud computing services, and to return a service result to the client terminal 222. End users may access cloud computing services using, for example, a web browser, mobile application, or thin client to access cloud-based applications and cloud-based data that implement the cloud computing services.

The cloud computing environment 200 may include a cloud controller 224. The cloud controller 224 may operate as a migration assistant to allow migrations between clouds in the cloud computing environment 200. A migration may be automated by the cloud controller 224, or in addition to automated steps, the cloud controller 224 may allow for manual steps performed based on inputs received by an information technology (IT) professional. The IT professional may be aided by system-provided wizardry when performing the manual steps. Any of the operations and methods disclosed herein may be implemented and controlled in the cloud computing environment 200 and/or the cloud controller 224.

The cloud controller 224 may include a processor 226 for executing instructions such as those described in the methods herein. The processor 226 may, for example, be a microprocessor, a microcontroller, a programmable gate array, an application specific integrated circuit (ASIC), a computer processor, or the like. The processor 226 may, for example, include multiple cores on a chip, multiple cores across multiple chips, multiple cores across multiple devices, or combinations thereof. In some examples, the processor 226 may include at least one integrated circuit (IC), other control logic, other electronic circuits, or combinations thereof.

The cloud controller 224 may support direct user interaction, for example by a user such as an IT (information technology) professional. User input devices 234 may be coupled to the processor 226, such as one or more of a keyboard, touchpad, buttons, keypad, dials, mouse, trackball, card reader, or other input devices. These input devices 234 may serve as management consoles. Additionally, the cloud controller 224 may include output devices 236 coupled to the processor 226, such as one or more of a liquid crystal display (LCD), printer, video monitor, touch screen display, a light-emitting diode (LED), camera display, or other output devices. The output devices 236 may be responsive to instructions to display textual and/or graphical information generated in the methods disclosed herein. The cloud controller 224 may include an input/output (I/O) port 238 to communicate with the clouds 202 and 206.

The processor 226 may be in communication with a computer-readable storage medium 228 via a communication bus 230. The computer-readable storage medium 228 may include a single medium or multiple media. For example, the computer readable storage medium 228 may include one or both of a memory of the ASIC, and a separate memory in the cloud controller 224. The computer readable storage medium 228 may be any electronic, magnetic, optical, or other physical storage device. For example, the computer-readable storage medium 228 may be, for example, random access memory (RAM), static memory, read only memory, an electrically erasable programmable read-only memory (EEPROM), a hard drive, an optical drive, a storage drive, a CD, a DVD, and the like. The computer-readable storage medium 228 may be non-transitory. The computer-readable storage medium 228 may store, encode, or carry computer executable instructions 232 that, when executed by the processor 226, may cause the processor 226 to perform any one or more of the methods or operations disclosed herein according to various examples. The computer-readable storage medium 228 may also store origin cloud model 240, destination cloud model 244, migration map 242, and repository data 246, each of which will be discussed in more detail.

The client terminal 222 may include a processor, computer-readable storage medium, bus, input devices, output devices, and I/O port that are similar to the processor 226, computer-readable storage medium 228, bus 230, input devices 234, output devices 236, and I/O port 238 of the cloud controller 224. The instructions in the computer-readable storage medium of the client terminal 222 may be to use cloud computing services.

Figure 2B:
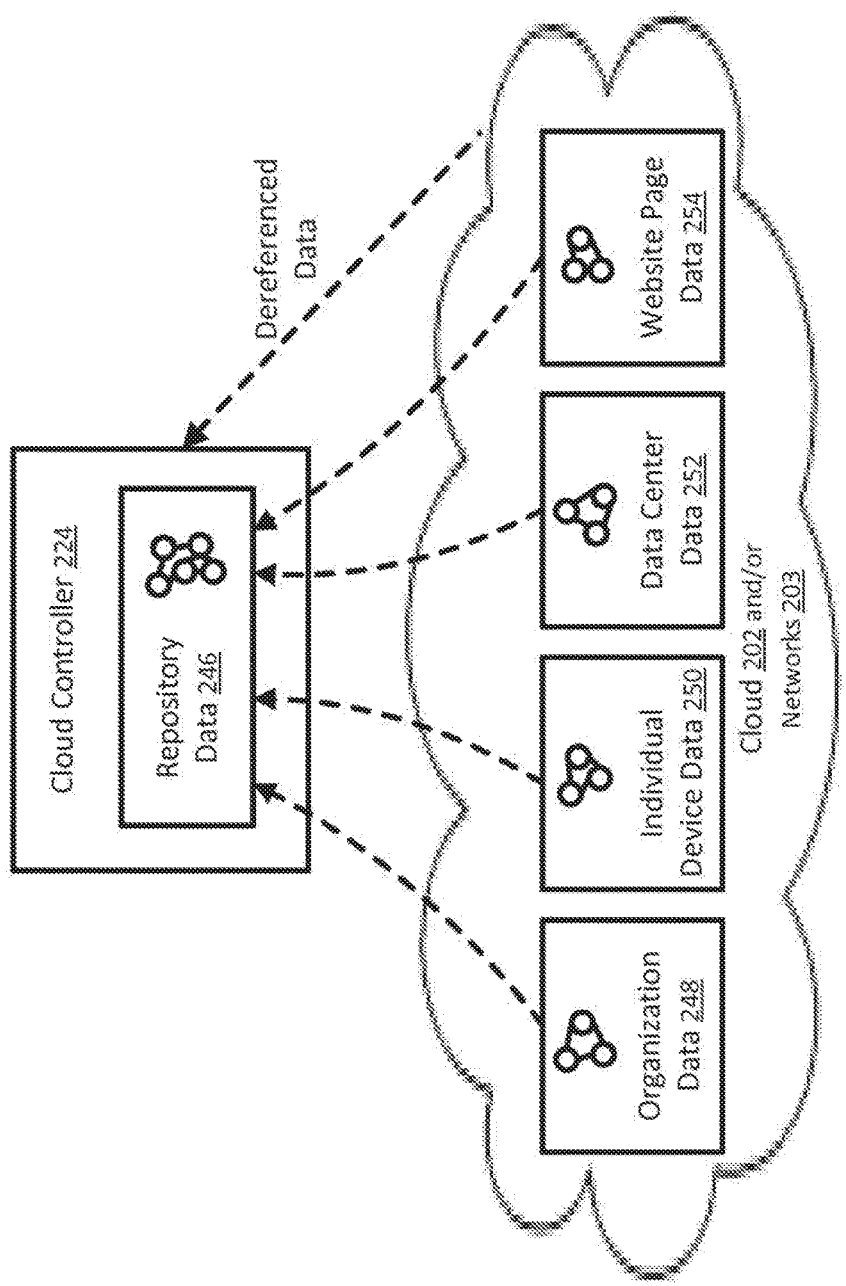

FIG. 2b is a simplified illustration of additional aspects of the cloud computing environment 200. The cloud 202 may store a migration repository having migration data. The migration data may be distributed, e.g. federated, in that the migration data may be stored as data fragments in multiple separate locations in the cloud 202 and/or other networks 203 such as the Internet. The repository data fragments may be stored in computer-readable storage media in the cloud 202 and/or networks 203 similar to the computer-readable storage medium 228 discussed earlier. FIG. 2b shows organization data 248, individual device data 250, data center data 252, website page data 254. These may be distributed across the cloud 202 in devices associated with the respective repository data. Any of the hardware resources mentioned earlier may store repository data fragments associated with the respective hardware resources. For example, the organization data 248 may be stored by a business unit of the organization using the cloud 202 in the cloud 202 or in another network. The individual device data 250 may be stored in specific systems, servers, or devices which the data 250 relates to. The data center data 252 may be stored in data centers which the data 252 relates to. The website page data 254 may be stored in intranet or Internet websites which the data 254 relates to.

Figure 3:
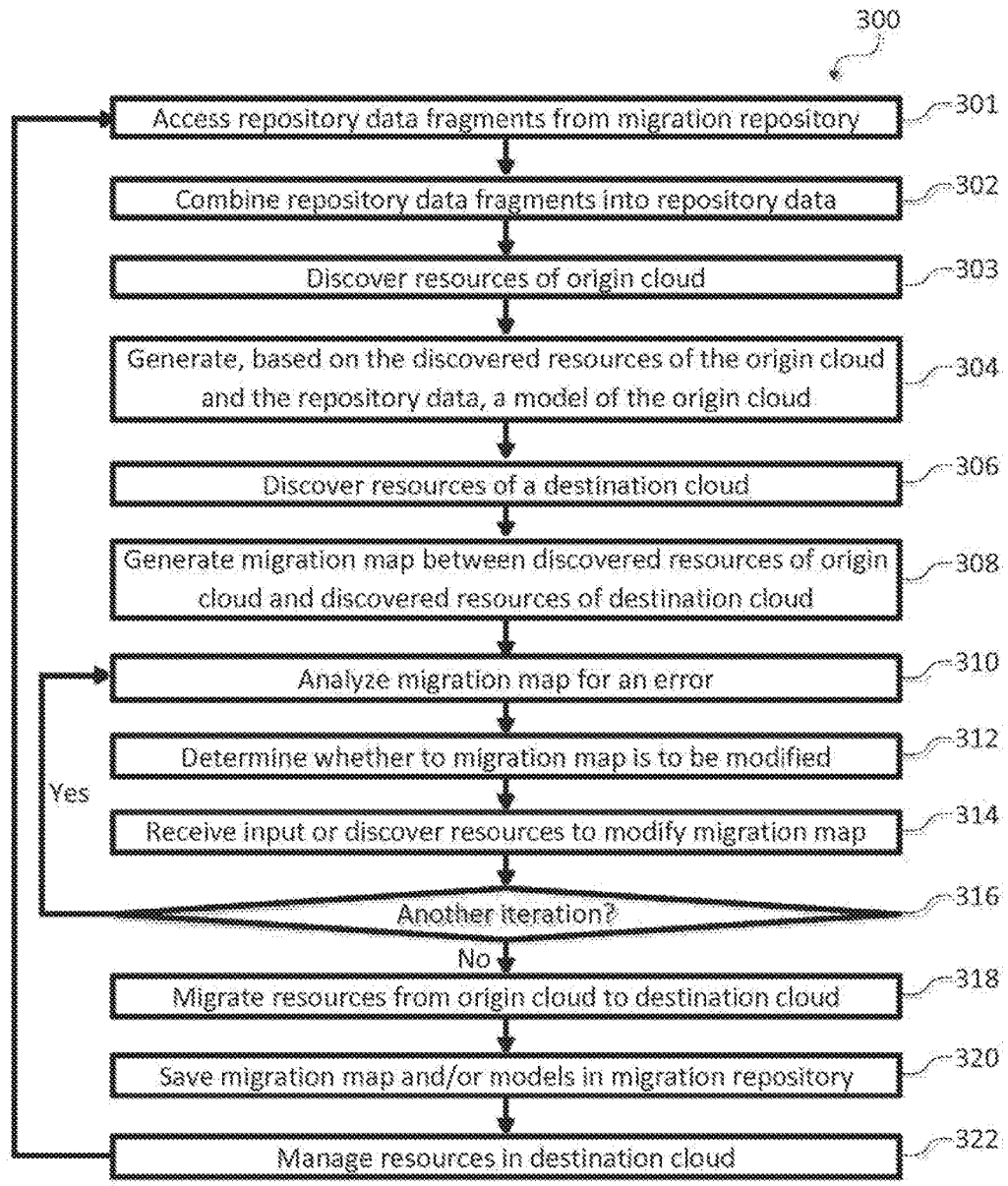
FIG. 3 is a flow diagram illustrating a method of cloud migration according to some examples.

FIG. 3 is a flow diagram illustrating a method 300 of cloud migration according to some examples. The method may be computer implemented. In describing FIG. 3, reference will be made to FIGS. 2a-b and 4-7. In some examples, the ordering shown may be varied, such that some steps may occur simultaneously, some steps may be added, and some steps may be omitted.

The method 300 may relate to migrating some resources of the cloud 202, e.g. the origin cloud, to the cloud 206, the destination cloud. As discussed earlier, the cloud 206 may already contain its own hardware 212, virtual hardware 215, software 220, and data 217, including its own proprietary versions of each. For example, the software 218, data 216, and cloud computing services of the cloud 202 may be migrated to the cloud 206, insofar as they are to replace and/or be added to the existing stock of resources in cloud 206. Initially, the cloud 202 may be to allow the client terminal 222 to use cloud computing services of the cloud 202. However, the cloud 202 may not yet been migrated to the cloud 206, thus the cloud 206 may not yet contain certain resources that are to be cloned or replicated from the cloud 202. Thus the cloud 206 may not be available to allow the client terminal 222 to use the cloud computing services that may be used with cloud 202.

At block 301, the repository data fragments, including for example the data fragments 248, 250, 252, and 254, may be accessed by the cloud controller 224. The data fragments may represent (1) the cloud 202's "cloud topology", which is its resources and dependencies that may have been previously discovered, for example in past migrations or through user input, and (2) migration archetypes such as archetypical cloud topologies and archetypical migration maps for how to migrate various types of resources. Example archetypes are of n-tier applications, such as the 3-tier application 500 if FIG. 5, which will be discussed. In some examples, data fragments may represent newly published archetypes, models, and migration maps that are published open-source on public networks such as the Internet, for example.

Each of the data fragments may be represented as a dependency graph, which is a directed graph representing dependencies, e.g. mappings or relationships, of several objects towards each other. However, other types of models may be used. A directed graph is a graph having objects connected by edges, where the edges have a direction associated with them. The dependency graph may be expressed in declarative language, which may include representations of each of the resources, and dependencies between each of the discovered representations. For example, the dependency graph may include dependencies between resources such as components of an application. Thus, the dependency graph may represent a cloud topology. Declarative languages include languages used to implement declarative programming, which is a style of building computer programs that expresses the logic of computation without describing its control flow. Examples of declarative languages include regular expressions, logic programming, functional programming, configuration management systems, and database query languages.

In some examples, the data fragments may be represented in various declarative language formats suitable for storage and/or for portability. For example, the data fragments may be in the K-Model format, which is a proprietary format that provides semantic modelling of cloud topology. Additionally, the K-Model format may allow users to intuitively understand the model, for example by allowing the model to be visualized on an output device 236 using human-understandable representations of the cloud topology. In further examples, the data fragments may be represented in a format that is portable to implement the model 240 in different clouds, such that the different clouds may provide the same cloud computing services represented by the model 240. An example format having the foregoing characteristics may be the Topology and Orchestration Specification for Cloud Applications (TOSCA) specification.

In some examples, the data fragments may be represented in a declarative language format such as an ontology language, which may encode knowledge about specific domains and may include reasoning rules to support processing of the knowledge. Ontology languages may allow analysis and modification of the data 246. Example ontology languages OWL (Web Ontology Language) and RDF (Resource Description Framework). RDF provides a flexible semantic model to decompose knowledge into small components with rules about the semantics of these components. OWL extends on RDF by providing additional vocabulary and additional syntax. These ontology languages may be published on the Internet and may be machine readable such that the cloud controller 224 may intelligently integrate information from any network including networks outside the cloud 202.

In some examples, data fragments stored in an ontology language such as RDF or OWL may be retrieved and manipulated using a query language such as SPARQL (SPARQL Protocol and RDF Query Language), which is a language that can be used to retrieve and manipulate distributed data fragments across various locations in ontology language formats such as RDF. SPARQL query results are sets of Universal Resource Identifier's (URI) that may be browsed and de-referenced by the cloud controller 224. This approach of de-referencing URIs may enable extraction of data from where it is hosted and maintained, thus eliminating the need to copy data into a centralized repository.

The data fragments may also provide for describing, using orchestration processes, the management procedures that create or modify cloud computing services. Orchestration processes are processes to automatically arrange, coordinate, and manage the cloud computing services and associated resources. The dependency graphs and orchestration processes in the data fragments may together represent a Service Template that describes what is needed to preserve the cloud computing services across deployments in different clouds.

At block 302, the data fragments may be combined into repository data 246. In some examples, the repository data 246 may represent the cloud topology of the cloud 202 as a whole, and may include all of the archetypical resources, dependencies, and migration maps.

The knowledge of the current state of the cloud 202 as well as cloud archetypes and migration archetypes of the repository data 246 may be used for migrations. For example, knowledge may be represented such as the current cloud service provider, current SLAs, past migrations, past user inputs, best practices, destination cloud environment characteristics, metrics of migrations including expected faults to result based on various migration processes.

As discussed earlier, data fragments may, for example, be stored in formats including K-Model, TOSCA, or ontology languages such as RDF or OWL. The combined repository data 246 may be generated and/or converted into a declarative language format suitable for analysis and modification of the data 246, as may be performed in the following steps of the method 300. If the data fragments are stored in an ontology language, no conversion may be performed when combining to generate the combined repository data 246, as ontology languages are suitable for analysis and modification. If the data fragments are stored in K-Model, then they may be converted to one of the ontology languages. If the data fragments are stored in TOSCA, then they may be converted into K-Model, and then into one of the ontology languages. Thus, in any of these cases, the combined repository data 246 may be represented by an ontology language, for example. The maintenance of the combined repository data 246, e.g. a single metadata RDF model, may be governed by a cloud service provider's architecture governance board.

At block 303, the cloud controller 224 may register with the cloud service provider 204 to obtain access to and discover the cloud topology, i.e. resources and dependences, of the cloud 202. Discovery of resources may include discovery of attributes of the resources. The discovered resources may include any of the resources described earlier in reference to FIG. 2a, including all the examples discussed earlier with reference to the hardware 210, virtual hardware 214, software 218, data 216, and the cloud computing services implemented using the hardware 210, virtual hardware 214, software 218, and data 216. The cloud controller 224 may discover the resources automatically. The discovered resources may include discovered hardware, software, data, and cloud computing services, for example.

The cloud controller 224 may discover the flavor of the cloud 202, such as a public, private or hybrid cloud. Additionally, use of VPCs may be discovered, including but not limited to firewall rules that are set up for users of the underlying public cloud.

Discovered hardware may include but may not be limited to data centers and computing devices such as servers. The discovered hardware may include content delivery networks (CDN), each of which may include a distributed set of data centers each having servers. Each server's flavor and type may be discovered. The Internet Protocol (IP) addresses used by the cloud 202 and its computing devices and/or server may be discovered. Server flavor refers to a hardware configuration including memory capacity and disk space, and type, such as proxy server. A server type refers to which application, service, or operation the server is to run, for example an application server, database server, or print server. The discovered hardware may also include components such as processors, memory, networking equipment, storage devices, network devices, and network infrastructure.

Discovered hardware and software may include, for example, monitoring tools, management tools, load balancing hardware and/or software to distribute workloads across various computing resources in the cloud 202, and auto scaling capability which is the ability of the cloud 202 to automatically change the amount of processing and/or storage capacity as needed for any given cloud computing services, server operating systems, and applications.

Discovered data may include credentials for logging into various resources of a cloud, and management data, which are data or statistics relating to management of the cloud. Management data include, for example, (1) capacity and size of computing devices or servers, (2) how many times a computing device and/or server has used heap which is a pool of memory allocated to fulfill memory requests by an application, (3) whether a computing device and/or server is CPU-bound, which is that the time to complete a computing task is mostly determined by processor speed, or input/output (I/O) bound, which is that the time to complete a computing a task is mostly determined by the time spent waiting for I/O operations to be completed, (4) service level agreements (SLAs), which define the level of service, such as delivery time, provided by cloud and/or cloud service provider, (5) instances of when the cloud has violated a service-level agreement (SLA), (6) monitored events, and (7) monitoring data at system-defined event monitoring points, which are parts of the cloud that the cloud monitors.

Figure 4:
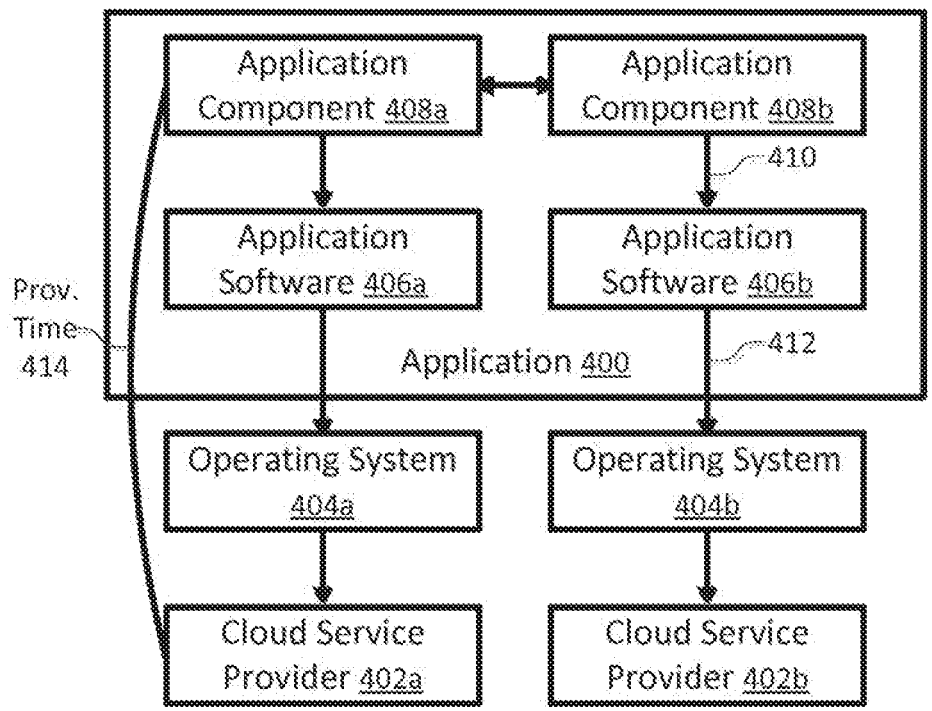
FIGS. 4-5 is a schematic diagram of discovered applications in a cloud computing environment according to some examples.

FIG. 4 is a schematic diagram of a discovered application 400 in a cloud computing environment according to some examples. As shown, application 400 may be hosted across different clouds by different respective cloud service providers 402a-b having respective operating systems 404a and 404b. The cloud service providers 402a-b. Application software 406a-b having respective components 408a-b may be run on the respective operating systems 404a-b. Various example dependencies between the resources are shown. Dependencies may be direct or may be inferred, for example. Direct dependencies 410 and 412 are shown between specific aspects of the application 400 and cloud computing environment. Additionally, the inferred dependency 414 is shown representing a provisioning time defining a time it may take for the component 408a to be run by the cloud service provider 402a.

Figure 5:
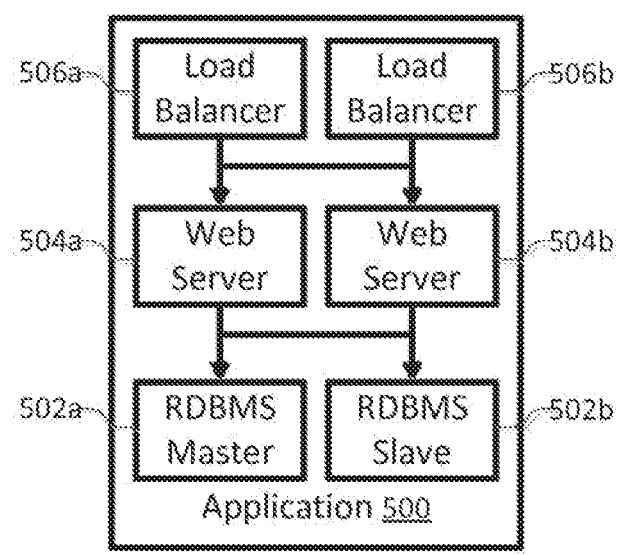

FIG. 5 is a schematic diagram of a discovered application 500 in a cloud computing environment according to some example. The application 500 is shown as a 3-tier application having stacked components, i.e. organized into tiers or layers. For example, the application 500 may have relational database management systems (RDBMS) 502a-b at a low level, web servers 504a-b at a medium level, and load balancers 506a-b at a top level. In some examples, when discovering applications, discovery may involve traversing an application tree from bottom-up, for example first discovering the RDBMS 502-ab at the low level, web server 504a-b at the medium level, and load balancer 506a-b at the top level. In some examples, the application 500 may be run by three servers, one server running load balancers 506a-b, one server running web servers 504a-b, and one server running the RDBMS master 502a and the RDBMS slave 502b.

Turning back to FIG. 3, at block 304, the cloud controller 224 may generate a model 240 of cloud 202 based on the resources discovered at block 303 and/or based on the prior knowledge in the repository data 246 such as previously discovered models or archetype models. Thus, the model 240 may be an updated version of a model of cloud 202 of in the repository data 246.

The model 240 may be generated automatically, for example using machine learning models such as Semantic Web frameworks. However, in some examples, the generation of the model 240 of the cloud 202 may additionally be based at least partly on instructions input from a user, such as an IT professional, using a user input device 234 of the cloud controller 224. The model 240 may be stored in a document on the cloud controller 224.

The model 240 may be a dependency graph and may include orchestration processes, as defined earlier with respect to the data fragments and repository data 246. The model 240 may be in the format of an ontology language, similar to the repository data 246.

At block 306, the cloud controller 224 may register with the cloud service provider 208 to obtain access to and discover the cloud topology, i.e. resources and dependencies, of the cloud 206. Discovery of resources may include discovery of attributes of the resources. The discovered resources may include any of the resources described earlier in reference to FIG. 2a, including all the examples discussed earlier with reference to the hardware 212, virtual hardware 215, software 220, data 217, and the cloud computing services implemented using the hardware 212, virtual hardware 215, software 220, and data 217. As with cloud 202, the cloud controller 224 may discover the flavor of the cloud 206. The cloud controller 224 may discover the resources automatically.

Because the cloud 206 is to be on the receiving end of the migration, the discovered resources of the cloud 206 may include capacity attributes of the resources of cloud 206 specifying resource capacities of the cloud 206. For example, capacity attributes of hardware resources may be discovered, such as storage, network, and data center specific information, for example power constraints, processing constraints, storage constraints, and the number of available racks of computing devices and/or servers. Capacity attributes may include capacity attributes of other resources such as software. Capacity attributes may include, for example, whether the cloud 206 allows use of physical servers and/or the use of virtual IP addresses. Capacity attributes may include firewall policies. Capacity attributes may include whether the migration to cloud 206 can be accomplished with zero down time, which is a time during migration when neither the cloud 202 nor the cloud 206 is fully operational. For example, there may be down time during migration from or to clouds having certain relation database service rules provided by certain cloud service providers. In examples in which there is zero down time, there is no service interruption during migration in providing cloud computing services.

To facilitate a smooth migration, the discovered capacity attributes of cloud 206 may allow determination of possible changes that need to be made to resources that may be migrated from cloud 202 to 206. In some examples, attributes of resources, such as attributes of applications, of the cloud 202 may be discovered based on the capacity attributes of cloud 206 discovered at block 306. Such attribute discovery of cloud 202 may aid in determining changes that need to be made to resources of cloud 202 that may be migrated. However, in other examples, these attributes of cloud 202 may have been discovered during the initial discovery of cloud 202 at block 303.

At block 308, based on the resources discovered at block 303, based on prior knowledge in the repository data 246 such as archetype migration maps, and/or based on the model 240 of the cloud 202 generated at block 304, the cloud controller 224 may generate a migration map 242 between the resources of cloud 202 and the resources of cloud 206 as it will be configured after migration is complete. Thus, the cloud controller 224 may also generate a model 244 of the resources of cloud 206 to represent the resources of cloud 206 after the migration is complete. The model 244 of cloud 206 and the migration map 242 may be stored in a document on the cloud controller 224. The model 244 of the cloud 206 and the migration map 242 may be generated automatically, for example using machine learned models such as Semantic Web frameworks. However, in some examples, the generation of the model 244 of the cloud 206 and the migration map 242 may additionally be based at least partly on input from an a user, such as an IT professional, using a user input device 234 of the cloud controller 224.

The migration map 242 may express changes that are necessary to migrate resources from the cloud 202 to the cloud 206. The migration map 242 may be represented and/or stored as data structure of any kind, for example a table such as Table 1 below, that describes attributes of the mapping. Although Table 1 shows mappings of various cloud computing services as an example, mappings of other resources, including hardware, software, applications, and data, may also be included in a migration map.

TABLE 1

Example of migration map 242

| Resource Type | Resource in Cloud 202 | Resource in Cloud 206 | Mapping plus Additional Instruction | Complexity | Scaling Policy |
|---|---|---|---|---|---|
| Cloud Computing Service: Network | Network resource | Network resource | 1-1 with Route53 compliant API | High | Instantiate new DNS server (Clone and Replicate) |
| Cloud Computing Service: MapReduce | MapReduce resource | MapReduce resource | None rewrite | High | Add new node to cluster |
| Cloud Computing Service: RDBMS | RDBMS resource | RDBMS resource | 1-1 with MySQL but changes drastically if it is not RDS | Low | Replication |
| Cloud Computing Service: Storage | Storage resource | Storage resource | 1-1, assuming only the key bucket management APIs are used | Medium | Adding new node is not necessary |

The migration map 242 may include a plurality of mappings. Each mapping may map a resource of the cloud 202 to a corresponding resource of the cloud 206. Each mapping may comprise, for example, as a 1-1 mapping in that one resource maps to one resource, 1-2 mapping in that one resource maps to two resources, 2-1 mapping in that two resources map to one resource, or the like. Each mapping may additionally comprise, for example, additional instructions to allow successful migration.

For each mapping, the migration map 242 may include reference to the corresponding resource in cloud 202 and the corresponding resource in cloud 206. Although generic terms such as "network resource" are shown in Table 1, the cloud controller 224 may populate the migration map 242 with specific product names and version numbers, and may identify whether such products and versions are different in cloud 206 compared to cloud 202.

In some examples, a mapping may map a resource of cloud 202 with a resource of cloud 206 having a different property than the resource of cloud 202. For example, a physical server may be mapped to a virtual server, dynamic IP address may be mapped to static IP address, or real IP addresses may be masked with virtual IP addresses in cloud 206. In further examples, mapped resources may have different versions, or resource capabilities may be different e.g. cell and block storage may be different across mapped resources.

Each mapping may be associated with a respective complexity indicator represent complexity of migration associated with the mapping. For example, the complexity indicator may represent one or more of (1) difficulty in migration of the resources associated with the particular individual mapping, (2) time to migrate the resources, (3) storage needed to migrate the resources, (4) application data size, (5) business risk of migration indicating the risk that the migration may not be error-free, (6) the number and nature of dependencies between resources of the cloud 202 to be migrated and resources of the cloud 202 that are external to resources of the cloud 202 to be migrated, (7) the number and nature of dependencies between the resource of the cloud 202 to be migrated and components external to the cloud 202, (8) whether the resources of the cloud 202 are deployed in multiple sites or regions, (9) whether the resource of the cloud 202 has privacy controls that may cause resource discovery to have been incomplete, (10) whether the resources of the cloud 202 are dependent on the specific cloud service provider 204 such that the resources may not be able to be completely migrated to the cloud 206, and (11) whether the migration from cloud 202 to cloud 206 can be accomplished with zero down time. In some examples, the complexity indicator may represent factors other than those specifically listed above.

In some examples, the complexity indicator may have a value within a hierarchy, such as high, medium, and low. However, additional gradations may be included. In some examples, the complexity indicator may represent all of the factors, such as in Table 1, but in other examples, each factor may have its own complexity indicator.

The migration map 242 may include a scaling policy representing whether the resource, such as an application component, of the cloud 202 is to be cloned using a clone operation or replicated using a replication operation. A clone operation involves copying a first resource to create a second resource that mimics the first resource. A replication operation involves synchronizing a first resource and a second resource.

For example, resources such as web servers and application servers are copied using a clone operation, whereas some database servers are synchronized using a replication operation. Which scaling policy to use may depend the technology and/or service provider. For example, whether to use a replication operation or a clone operation on a database server may vary based on the database technology used.

At blocks 310 to 316, the cloud controller 224 may iteratively modify the migration map 242 and/or the model 244. The modification may be performed recursively, for example each iteration of blocks 310 to 316 may build upon the output of a respective previous iteration of blocks 310 to 316. Recursive modification may be to increase the accuracy of the migration map 242 and/or the model 244. The blocks 310 to 316 are described in more detail below.

At block 310, the cloud controller 224 may, for example, determine whether the migration map 242 and/or model 244 has one or more errors. For example, the cloud controller 224 may simulate a migration from cloud 202 to cloud 206 to validate whether the migration map 242, and thus model 244, is valid and will be able to be used successfully in an actual migration. The cloud controller 224 may output simulation results of the simulated migration on an output device 236 for viewing by a user, such as an IT professional.

At block 312, the cloud controller 224 may determine, based on the analysis, whether the migration map 242 and/or model 244 are to be modified. For example, the cloud controller 224 may determine, based on the simulation results, that the migration map 242 is valid or invalid. The migration map 242 may be invalid because, for example, it contains an error, e.g. it contains an inconsistency, prohibited attribute, or does not comply with a specification for the migration map 242 and/or model 244. For example, the specification may mandate that the migration map 242 and/or model 244 have specific attributes, such as satisfy certain security standards. In some examples, the specification may be user defined.

At block 314, the migration map 242 and/or model 244 may be modified based on additional automated resource discovery of the clouds 202 and 206 and/or user input.

A user input device 234 of the cloud controller 224 may receive user input to make any manual changes to the migration map 242. In some examples, the user may view a particular resource on an output device 236, and by analyzing its dependencies, may determine the impact of the resource on other resources and its effect on business objectives and/or cloud computing services. This may aid the user in making changes.

In some examples, if the migration map 242 was found to be requiring changes or found to be invalid at block 312, then the user may correct any errors in the migration map 242, e.g. correct inconsistencies and/or correct lack of compliance with the specification.

Additionally, the user may add and/or update resources and/or dependencies that the user knows were not accurately discovered automatically by the cloud controller 224. For example, such user input may include mapping resources to appropriate applications and services. An example is that the application 500 of FIG. 5 along with three servers were discovered, however a user may provide dependencies such as that the application 500 is to be hosted across the three discovered servers, wherein the RDBMS 502a-b are running on one server, the web servers 504a-b are running on another server, and a load balancers 506a-b are running on yet another server. In some examples, the user may not provide any input, for example if the migration map 242 is valid. In some examples, there may be no simulation of block 310 or determination of validity of block 312, and instead the user may directly provide manual input at block 314.

Additionally, the cloud controller 224 may perform additional discovery of resources according to the methods discussed in blocks 303 and 306, based on (1) modifications to be made as determined at block 312, such as whether the migration map 242 and/or model 244 are valid, and/or (2) the current instance of the migration map 242 and/or model 244. Thus, additional resources and dependencies may be discovered that were not previously discovered because less information may have been known about the clouds 202 and 206 during previous discovery. The additional discovery may be used to automatically modify the migration map 242 and/or model 244.

In various examples, one or a combination of both of manual input and additional automated resource discovery may be used to modify the migration map 242 and/or the model 244.

At decision block 316, if another iteration of simulated migration and/or modification is to be performed, then the method 300 may return to block 312. For example, the user may input into the input device 236 that an additional iteration is desired or the cloud control 224 may automatically determine that another iteration is to be performed. For example, such a decision may be made if the latest simulations results had shown that the migration map 242 is invalid. If another iteration of simulated migration and/or manual changes is not to be performed, then the method 300 may proceed to block 318. For example, such a decision may be made if the latest simulation results do not exhibit any error, and there were no additional changes made to the migration map 242 after the latest simulated migration.

At block 318, the cloud controller 224 may migrate resources of the cloud 202 to the cloud 206. For example, the software 218, data 216, cloud computing services resources of the cloud 202, and any other relevant resources may be migrated to the cloud 206, insofar as they are to replace and/or be added to the existing stock of resources in cloud 206. The migration may be performed using the migration map 242 and/or the model 244. The migration may occur automatically at this stage, however in some examples, the input device 234 may receive input a user, such as an IT professional, to perform the migration.

In some examples, the migration may be user-based. The resources of the cloud 202, such as an application, may be deployed in the cloud 206 such that both clouds 202 and 206 may host the application. Then, a smart forwarder application may be accessed by an end user on client terminal 222 to generate user requests which may be forwarded, based on user location or user device location, either to an the old application running on the cloud 202 or to the new application running on the cloud 206.

In some examples, the migration may be component-based. For example, the migration may be performed on a resource-by-resource, e.g. component-by component, basis. A scaleout operation may gradually migrate resources, e.g. components of an application, from the cloud 202 to the cloud 206, and a scalein operation may gradually terminate migrated resources in cloud 202. An example of a component-based migration of block 318 is shown in FIG. 6.

Figure 6:
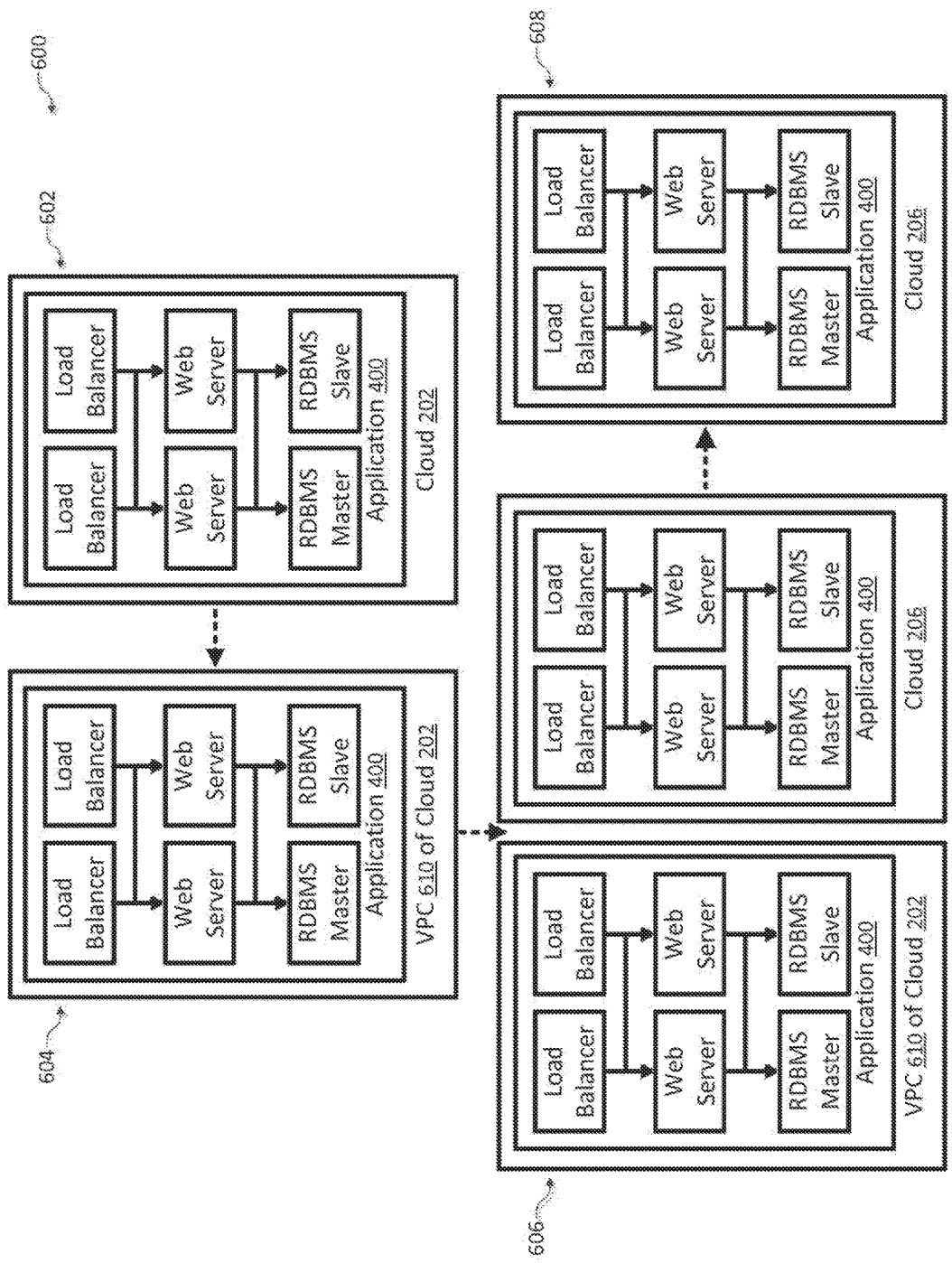
FIG. 6 is a schematic and flow diagram illustrating a migration 600 according to some examples.

FIG. 6 is a schematic and flow diagram illustrating a migration 600 according to some examples. The migration may include a scaleout operation and a scalein operation. A scaleout operation is a clone operation or replication operation performed according to a scaleout policy defining whether the operation is to be a clone operation or a replication operation. A scalein operation is an operation to decommission and/or terminate resources.

At 602, the example of FIG. 6 shows the cloud 202 having the 3-tier application 500 of FIG. 5 discussed earlier as an example. However, other resources may be present.

At 604, a virtual private cloud (VPC) 610 instance of the cloud 202 may be generated based on the cloud 202, and may be run on the cloud 202. Different cloud service providers generally may assign different IP addresses to their respective clouds. Thus, the generated VPC 610 may be assigned IP addresses that are used in the destination cloud 206 and/or owned by the cloud service provider 208. Thus, the generation of the VPC 610 may allow easier migration based on the matching IP addresses between the VPC 610 and the cloud 206. However, in other examples, the VPC 610 may not be generated.

At 606, a scaleout operation may be performed on resources of the cloud 206 based on the resources of the cloud 202, the VPC 610, or both. In examples in which no VPC 610 was generated, the scaleout operation may be performed based on the resources of the cloud 202. The scaleout may be performed using programming techniques such as Inversion of Control (IOC) and/or Dependency Injection (DI). These techniques may allow flexible ways to recursively define dependencies at runtime. For example, these techniques may allow removal of hard-coded dependencies between resources of cloud 206 to allow completion of the scaleout operation to modify the cloud 206 in line with the migration map 242 and the model 244 to achieve migration. By migrating to the cloud 206 before terminating the cloud 202 and/or the VPC 610, cloud functionality may continue with little or no interruption.

At 608, a scalein operation may be performed on resources of the cloud 202 to decommission and/or terminate resources running on the cloud 202 and/or the VPC 610.

Turning back to FIG. 3, at block 320, the generated migration map 242 and/or the model 244 may be used by the cloud controller 224 to update the repository data 246 to reflect the latest migration and current resources and dependencies in the destination cloud 206. The repository data 246 may be converted into data fragments of the type discussed earlier, and stored in a distributed manner throughout the cloud 206 and/or other networks 203. The saved data fragments may be converted from ontology language to K-Model or TOSCA formats, and/or may be saved in ontology language formats.

At block 322, the cloud controller 224 may perform automated lifecycle management of the resources in the destination cloud 206. Example lifecycle management actions may include auto-remediation, auto-scaling, upgrades or rollbacks of components, and backups or restore operations for components. etc. This may provide stability and continuous improvement to the cloud 206.

When an additional migration is desired, the method 300 may return to block 301 to migrate the cloud 206 to another cloud. In such case, the cloud 206 may be the origin cloud and the other cloud may be the destination cloud.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

What is claimed is:

1. A computer implemented method of cloud migration, the method comprising:
    accessing repository data fragments distributed across one or both of a first cloud and a network;
    combining the repository data fragments into repository data;
    discovering first resources of the first cloud, and a dependency between the first resources, and second resources of a second cloud;
    generating a model of the first cloud based on the discovered first resources of the first cloud and the repository data;
    discovering second resources of a second cloud;
    generating a migration map between the first cloud and the second cloud based on the discovered first and second resources and based on the repository data;
    analyzing the migration map for any errors and to determine the validity of the migration map;
    recursively modifying the migration map in response to determining that the migration map is invalid or contains an error, wherein the recursive modification comprises a manual input, an additional automated resource discovery, or a combination thereof; and
    migrating the first resources to the second cloud based on the modified migration map.

2. The computer implemented method of claim 1 wherein the repository data represents a migration archetype comprising an archetypical migration map or an archetypal cloud topology.

3. The computer implemented method of claim 1 wherein the repository data represents resources and dependencies previously discovered in a past migration to the first cloud.

4. The computer implemented method of claim 1 wherein the data fragments are distributed across the first cloud.

5. The computer implemented method of claim 1 wherein the data fragments are distributed across the network, the network being the Internet.

6. The computer implemented method of claim 1 wherein the repository data is represented in an ontology language.

7. The computer implemented method of claim 6 wherein the ontology language is OWL (Web Ontology Language) or RDF (Resource Description Framework).

8. The computer implemented method of claim 6 wherein the repository data fragments are accessed using SPARQL (SPARQL Protocol and RDF Query Language).

9. The computer implemented method of claim 1 further comprising generating a model of the first cloud based on the discovered first resources and first dependencies, the model expressed in declarative language.

10. The computer implemented method of claim 1 further comprising discovering a capacity attribute of the second cloud, wherein the migration map is generated based on the discovered capacity attribute.

11. The computer implemented method of claim 1 wherein the discovery is automatic.

12. A non-transitory computer readable storage medium including executable instructions that, when executed by a processor, cause the processor to:
   access repository data fragments distributed across at least one of a first cloud and a network;
   combine the repository data fragments into repository data;
   discover a first cloud topology of the first cloud, the first cloud topology representing resources of the first cloud and a dependency between the first resources;
   generate a model of the first cloud based on the discovered first cloud topology and the repository data;
   discover a second cloud topology of a second cloud;
   determine and generate a migration map between the first and second clouds based on the first and second cloud topologies and the repository data;
   analyze the migration map for any errors and to determine the validity of the migration map;
   recursively modify the migration map in response to determining that the migration map is invalid or contains an error, wherein the recursive modification comprises a manual input, an additional automated resource discovery, or a combination thereof; and
   migrate the resources to the second cloud based on the modified migration map.

13. The non-transitory computer readable storage medium of claim 12 wherein the repository data represents at least one of an archetypical migration map, an archetypal cloud topology, and a resources and dependencies previously discovered in a past migration to the first cloud.

14. A cloud controller comprising:
   a memory; and
   a processor coupled to the memory to:
      access data fragments distributed across one or both of a first cloud and a network;
      combine the data fragments into repository data;
      discover first resources of the first cloud and and a dependency between the first resources;
      generate a model of the first cloud based on the discovered first resources of the first cloud and the repository data;
      discover second resources of a second cloud and a capacity attribute of a second cloud;
      generate a migration map between the first cloud and the second cloud based on the discovered first resources, the discovered capacity attribute, and the repository data;
      analyze the migration map for any errors and to determine the validity of the migration map;
      recursively modify the migration map to increase accuracy of the migration map in response to determining that the migration map is invalid or contains an error, wherein the recursive modification comprises a manual input, an additional automated resource discovery, or a combination thereof; and
      migrate the first resources to the second cloud based on the modified migration map.

15. The cloud controller of claim 14 wherein the migration is based on the modified migration map.

* * * * *